United States Patent [19]
Dalenberg et al.

[11] Patent Number: 6,108,669
[45] Date of Patent: Aug. 22, 2000

[54] METHOD AND APPARATUS FOR CREATING AND MODIFYING DATABASES DERIVED FROM A DATABASE WAREHOUSE FOR A TELECOMMUNICATION SYSTEM

[75] Inventors: Russel V. Dalenberg, Naperville; Joseph Francis Lennert, Bolingbook; Jeffrey W. Lev, Crystal Lake; William T. Mahaney, Yorkville; Charlene Ros, Aurora; Christopher Dean Sallstrom, Lisle, all of Ill.

[73] Assignee: Lucent Technologies, Inc., Murray Hill, N.J.

[21] Appl. No.: 09/053,957

[22] Filed: Apr. 2, 1998

[51] Int. Cl.[7] .................................................. G06F 17/30
[52] U.S. Cl. .............................. 707/203; 707/1; 707/101; 379/219
[58] Field of Search ........................ 707/203, 204, 707/1–3, 104, 100–102; 379/14, 207, 226–227, 219

[56] References Cited

U.S. PATENT DOCUMENTS

| | | | |
|---|---|---|---|
| 5,390,335 | 2/1995 | Stephen et al. | 709/221 |
| 5,432,931 | 7/1995 | Woess et al. | 707/10 |
| 5,513,171 | 4/1996 | Ludwiczak et al. | 370/13 |
| 5,625,816 | 4/1997 | Burdick et al. | 707/104 |
| 5,875,242 | 2/1999 | Glaser et al. | 379/207 |
| 5,933,837 | 8/1999 | Kung | 707/201 |
| 6,003,035 | 12/1999 | Breame | 707/102 |

*Primary Examiner*—Hosain T. Alam

[57] ABSTRACT

In this invention, a computer program stored in the memory of a computer is used to mine preexisting data located in a variety of preexisting source databases. The computer program either creates a new database from parts of existing databases or modifies an existing database. The computer program replaces the current system's reliance upon manual data entry by data engineers to configure the operation of a new telecommunication switch or replace the software in a telecommunication switch that was damaged or requires a new data configuration. The invention is a computer containing a software program capable of manipulating and modifying data from source databases during the creation or modification of a new database. This invention provides accurate and timely customer information, significantly decreases the time interval for engineering a new database, decreases the research and data entry time, decreases the interval for lab planning and project management, improves database integrity, provides a cleaner database, reuses existing data eliminating double data entry, reuses some existing software code, and uses preexisting office data administration tools and provides a platform for future growth and expandability. By accomplishing these tasks, the telecommunication switch manufacturer or telecommunication switch operator saves time, money and decreases time-to-market product and service schedules.

30 Claims, 10 Drawing Sheets

METHOD AND APPARATUS FOR CREATING AND MODIFYING DATABASES DERIVED FROM A DATABASE WAREHOUSE FOR A TELECOMMUNICATION SYSTEM

FIELD OF THE INVENTION

This invention relates to a computer and a program stored in memory on the computer that can create new databases from all or parts of one or more existing databases containing data information for the operation of data and voice audio telecommunication switches.

DESCRIPTION OF THE PRIOR ART

The configuration of telecommunication switches usually occurs in at least three environments. First, during the testing of switch hardware and software, a laboratory switch is configured to the requirements established for the test. Second, when a switch is sold to a customer, the switch is configured to the customer's specifications. Third, when a switch experiences a full failure, it often requires reconfiguration of the databases supporting the failed switch or configuration of new databases for an emergency backup switch or replacement switch. Normally, the configuration of telecommunication switches during these three environments requires the manual input of thousands and possibly millions of records of information. This process is extremely time consuming and can take weeks or months to complete.

In the first environment, telecommunication companies continually test new versions of switch software, peripheral devices and other hardware devices during the life of a telecommunication switch. When testing software or hardware, switch engineers design different operating environments to establish operating parameters of the new software or hardware. Data engineers manually input data to configure the operation of the switch for the designed test. Usually, the configuration of the testing environment is performed on a data build machine (computer). The configuration of the switch to simulate the desired testing operational conditions often involves retesting archived configurations or modified archived configurations. Otherwise, the testing configuration is accomplished by manual data entry.

In the second environment, telecommunication switches sold to customers are configured based on the customer's intended operational conditions and requirements. Usually, the configurations for new switches are manually built new data configurations without relying on existing database configurations. However, the configuration of the features, switching software and hardware is often adopted from other existing configurations.

The third operational environment is recovery of the switch after the switch has experienced a failure. These failures can result from equipment failure to natural disasters such as earthquakes, hurricanes or fires. Recovery of the failed switch sometimes requires the installation of an emergency backup switch. The emergency backup switch requires database configurations that replicate the databases in the damaged switch. Normally, the configuration of the emergency backup switch requires manual, time consuming input of data that will support specific customer features and routing of calls on the emergency backup switch. Having the ability to configure the telecommunication switch by transferring existing data information from known databases into new databases by automating the manual tasks of data entry would save considerable time, money and significantly improve productivity. In addition, instant access to many different switching systems is a critical task that currently requires many hours or days of research and manual browsing. A need exists for a robust process to automatically replace the current manual method data entry to configure dialing plan data for telecommunications switches.

SUMMARY

In order to automate the current manual data entry process of engineering databases from other preexisting databases, the method and apparatus of this invention establishes a new database structure and mines source databases to load source database data into the new database structure. The method and apparatus are capable of searching for the desired data and automates many of the tasks for configuring a new database from the source databases. This eliminates the current requirement for manual data entry for configuring new databases.

This method and apparatus is multifunctional allowing for the browsing of all databases. Once the target databases are known, the method and apparatus utilizes office data administration tools to selectively copy parts of the target databases into a new database. This task is accomplished by executing various routines and using the office data administration tools to mine the desired data and input this data into data elements created by the office data administration tools.

The invention selects the source databases, creates an index of desired data elements and converts the desired data elements from binary into ASCII format. The desired data is manipulated and modified to for the configuration into the new database. The data is extracted and converted to the same version (software release) and loaded into the new dialing plan data directory structure. The invention includes a computer containing the software program capable of manipulating and modifying data from source databases during the creation or modification of a new database.

This invention provides accurate and timely customer information, significantly decreases the time interval for engineering a new database, decreases the research and data entry time, decreases the interval for lab planning and project management, improves database integrity, provides a cleaner database, reuses existing data eliminating double data entry, reuses some existing software code, use preexisting tools, and provides a platform for future growth and expandability. By accomplishing these tasks, the telecommunication switch manufacturer or telecommunication switch operator saves time, money and decreases time-to-market product and service schedules.

DESCRIPTION OF THE DRAWINGS

The summary of the invention, as well as the following detailed description of preferred embodiments, is better understood when read in conjunction with the accompanying drawings, which are included by way of example, and not by way of limitation with regard to the claimed invention.

DESCRIPTION OF THE PREFERRED EMBODIMENT

The following applications are filed concurrently and are also incorporated by reference:
1. Method for Creating and Modifying Similar and Dissimilar Databases for use in Dialing Plan Configurations for Telecommunication Systems (U.S. Ser. No. 09/054,094).
2. Method for Creating and Modifying Similar and Dissimilar Databases for use in Hardware Equipment Configurations for Telecommunication Systems (U.S. Ser. No. 09/054,207).
3. Method for Creating and Modifying Similar and Dissimilar Databases for use in Network Configurations for Telecommunication Systems (U.S. Ser. No. 09/053,961).
4. Method for Creating and Modifying Similar and Dissimilar Databases for use in Operator Services Configurations for Telecommunication Systems (U.S. Ser. No. 09/054,206).
5. Method for Creating and Modifying Similar and Dissimilar Databases for use in Private Branch Exchange Configurations for Telecommunication Systems (U.S. Ser. No. 09/054,193).
6. Method for Creating and Modifying Similar and Dissimilar Databases for use in Intelligent Network Configurations for Telecommunication Systems (U.S. Ser. No. 09/054,329).
7. Method for Creating and Modifying Similar and Dissimilar Databases for use in GSM Wireless Network Configurations for Telecommunication Systems (U.S. Ser. No. 09/054,324).

Figure 1:
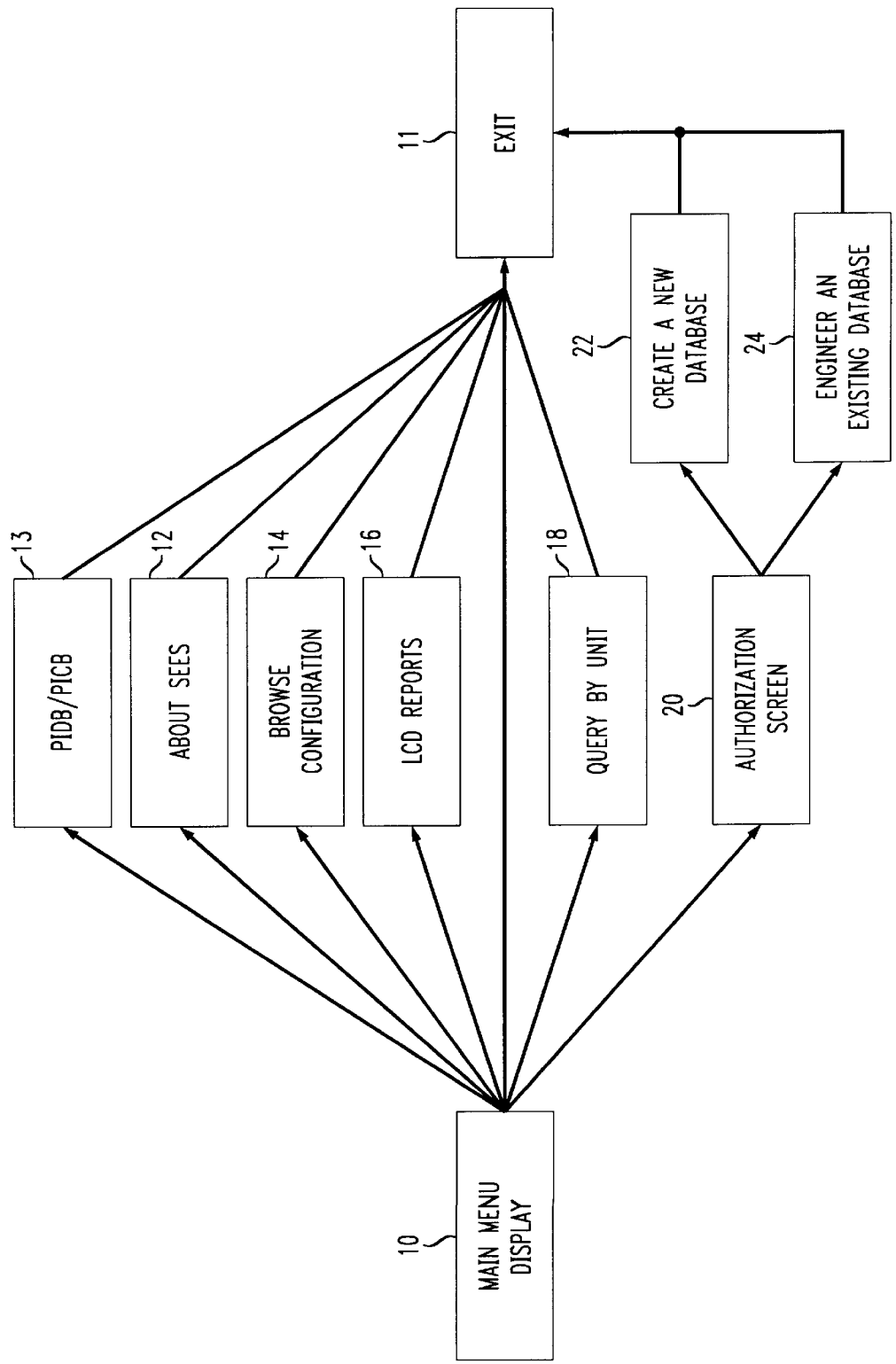
FIG. 1 is a functional flow chart illustrating the logical operations of the main menu of the computer program.

FIG. 1 illustrates the logical operation of the main menu of the user interface for the Simple Environment Engineering System ("SEES") computer program. If SEES is wrongly selected as the application of choice by the user, the main menu display 10 allows the user to exit 11 the computer program without choosing any of the functions. If SEES is selected as the program of choice by the user, from the main menu display 10, the user can select from one of seven operations.

These operations include: about SEES 12, peripheral interface data bus/peripheral interface control bus (PIDB/PICB) 13, browse feature 14, lab configuration document reports 16, query by unit 18, create a new database 22, or engineer an existing database 24. About SEES 12 is documentation about the computer program and the operations and features that a user can implement. Peripheral interface data bus (PIDB) /peripheral interface control bus (PICB) 13 allows a user to examine the peripheral units in the switching modules as they are connected to the interface control and data buses.

The browse feature 14 allows users to view the location and type of data in other databases. This feature allows the user to search for and find the desired data prior to generating new data from scratch. The lab configuration document reports 16 provide data on all the hardware for a given lab or for a customer's switch. Query by unit 18 identifies hardware items, features, signaling types, or other elements of the switch across many databases containing information on lab switches, manufacturers' switches, and/or customers' switches. Query by unit 18 also specifies and conforms targeting specific software releases to common versions.

The last two operations, create a new database and modify an existing database, have a guard dog or authorization screen 20 that prevents entry by unauthorized users into the program. Entry by unauthorized users beyond the browse feature impact existing source databases and source data resources. Allowing unauthorized users to create and modify existing source databases and source data resources can have severe effects on other operations due to the unintended destruction of valuable data. The computer program will query the user or the user's computer for authorization to gain access to those features of the program that allow for the creation or modification of databases or data resources. Typical authorized users are data engineers. Once the screening process is complete, access is permitted, and another text or graphical user interface menu is displayed that allows the user to select features other than browse. From all six of these operations, a user can exit 11 the program.

The computer program uses all current data environments and employs functions to ensure that different versions of various software databases are converted to a common version. SEES provides accurate configuration information to customers on all environments to the switch module. SEES uses an office data administration tool called "init-office" to insure a clean initial database structure. SEES automatically updates the newest office data administration tool issues and environs.

Figure 2:
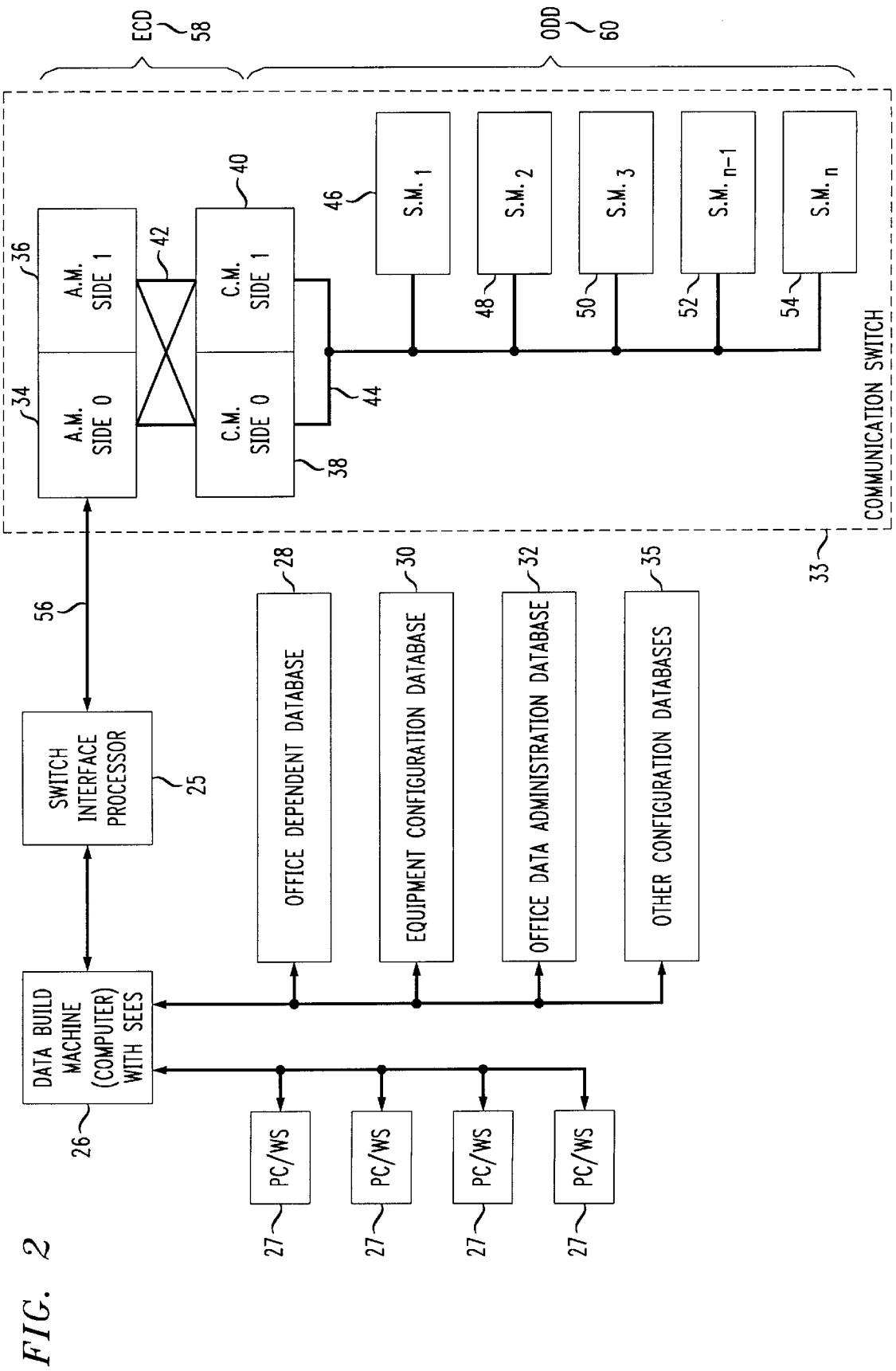
FIG. 2 illustrates the various hardware components and database types used in conjunction with the computer program.

FIG. 2 illustrates the various hardware components used in conjunction with a telecommunications switch 33. A data build machine 26 is used to create the data information used in the operation of a telecommunications switch 33. The data build machine 26 usually contains or has access to the source databases such the office dependant database 28, the equipment configuration database 30, the office data administration tools 32, and other configuration databases 35. The SEES computer program located on the data build machine 26 relies on various tools or routines to help in the execution of its operation.

Also connected to the data build machine 26 are a variety of personal computers or work stations 27. The data build machine 26 is also connected to a switch interface processor 25. The switch interface processor 25 is capable of connecting to other data build machines or communication switches 33. The connection 56 between the switch interface processor 25 and other communication switches 33 or data build machines can be a physical link such as a communication line (fiber, coaxial cable, twisted pair, etc.) or a nonphysical link such as transferring tapes or disks containing the data. Other communication links include radio frequency (RF) links by satellite transmission of data or wireless transmission of data.

Many telecommunication switches 33 have redundant administration modules represented by a zero side 34 and a one side 36. The redundant administrative modules 34 and 36 operate such that one of the modules is operating while the other one is on standby. If the operating administrative module fails, the administrative module on standby starts operating without causing a loss of services. This is also true for the redundant communication modules which have a zero side 38 and a one side 40. The administration modules 34 and 36 and the communication modules 38 and 40 are crossed linked by communication links 42. The cross linking of administration modules 34 and 36 with communication modules 38 and 40 eliminates the interruption of service should one of these modules fail. Connected via communication link 44 to the communication modules 38 and 40 are switch modules 46, 48, 50, 52 and 54. Each telecommunication switch 33 has at least one switch module (SM). The Lucent Technologies' 5ESS Switch can currently support up to 192 switch modules connected to the administrative modules 34 and 36 and communication modules 38 and 40.

The equipment configuration database 30 contains information regarding the administration modules 34 and 36 and part of the communication modules 38 and 40 (encompassing items corresponding to bracket 58 in FIG. 2). The equipment configuration database 30 keeps track of all the equipment hardware associated with the telecommunication switch 33 including the various equipment types of the hardware such as tape units, circuit packs, administration module links and disks containing the software versions used in conjunction with the hardware and all associated resources.

The office dependent database 28 contains information regarding part of the communication modules 38 and 40 and the switch modules 46, 48, 50, 52 and 54 (encompassing items corresponding to bracket 60 in FIG. 2). The office dependent database 28 is loaded on the memory disk in the administration modules 34 and 36 and is pumped or downloaded into the switch module memory. The office dependent database 28 provides call set up, functional feature capability of the switch modules, and defines all switch module hardware configuration information.

Figure 3:
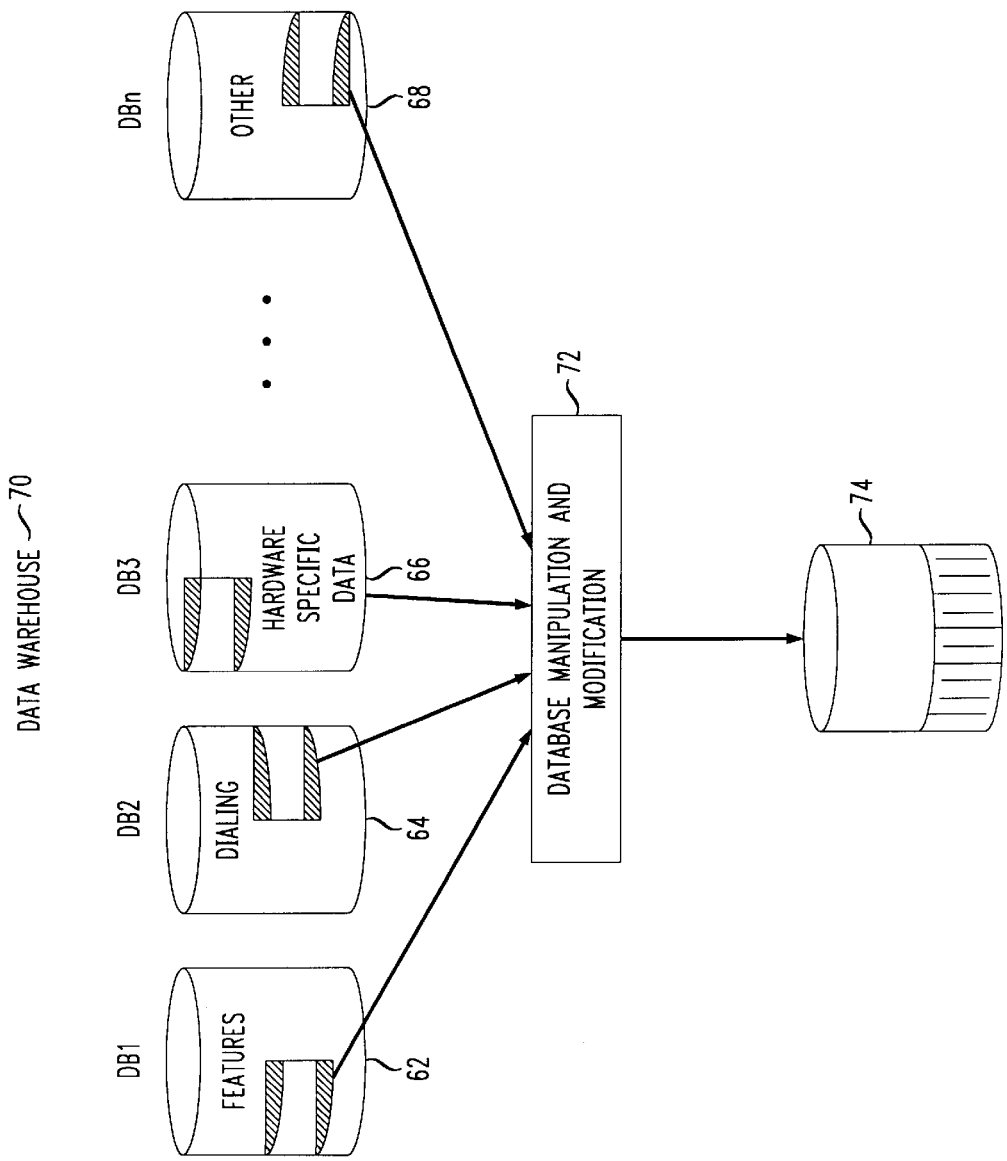
FIG. 3 illustrates the operation of the computer program as it builds a new database from parts of other databases.

FIG. 3 illustrates the operation of the Simple Environment Engineering System as it builds a new database from parts of other databases. In a typical setting, DB-1 62 contains information regarding features such as rate and routing information. DB-2 64 contains dialing information such as specific switch module configurations and networking rate and routing information. DB-3 66 contains hardware platform information such as additional switch module configurations. DB-n 68 are other databases in the data warehouse 70 containing information such as additional features or hardware. SEES identification routines browse the data warehouse 70 looking for desired components for reuse. In the database section modifier 72, SEES pulls new components from the various databases inthe data warehouse 70 and with some modification such as altering the hardware designations for the software data, SEES creates a new database 74.

Figure 4:
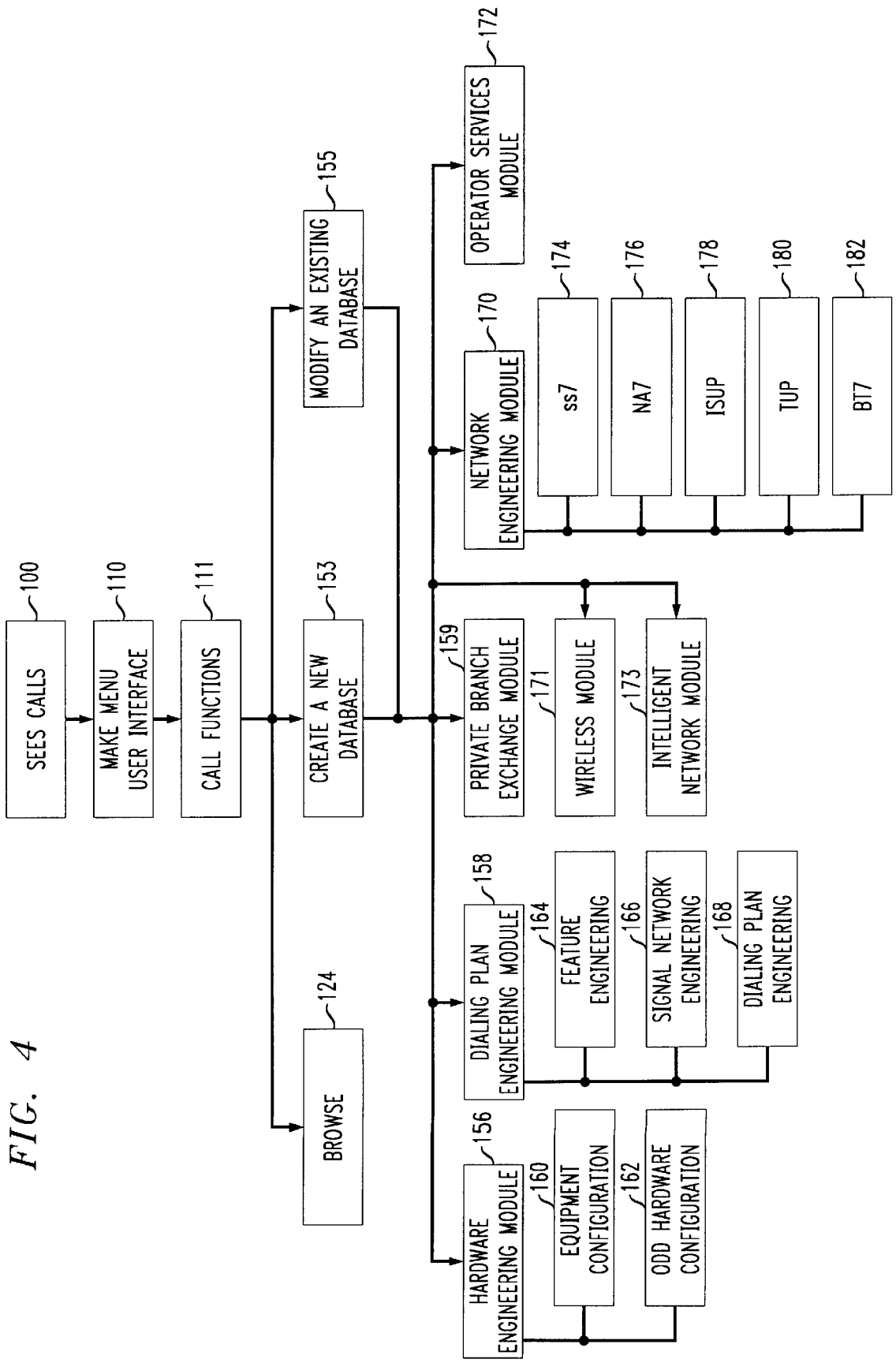
FIG. 4 is a flow chart of the overall features exercised in the operation of the computer program.

FIG. 4 illustrates the overall features of SEES. "SEES calls" 100 is a routine that calls other components of the program such as the make menu user interface (mkmenu) routine 110. The SEES' user interface allows a user to incorporate a variety of utilities including UNIX, web based languages, directories, databases, office data administration tools, DOS, and other applications. The make menu (mkmenu) routine 110 can be set up to use menu driven utilities employing streamlined commands, shortcuts, object menus, pictures or icons.

From the user interface screen 110, the user can call function 111 that implements the various configuration features of the computer program. The browse feature 124 restricts users to a read only environment but because of this restriction, allows many more unsophisticated users to use SEES to view the various databases used in the operation of a telecommunication switch 33. For more sophisticated users who have authorization to get past the guard dog 20, SEES queries as to whether a new database will be created 153 or whether an existing database will be modified 155. Either choice allows the user to select one of the seven configuration scheme features of SEES.

The first feature of SEES is the hardware engineering module 156. This module includes the equipment configuration block 160 that allows users to examine the properties of the administrative modules 34 and 36 and the communication modules 38 and 40 used in the operation of a telecommunication switch 33. The office dependent database block 162 contains the data structures that control and describe the hardware and services for the various switching systems and contains information allowing the communication between the communication modules 38 and 40 and the switch modules 46, 48, 50, 52 and 54.

The second feature of SEES is the dialing plan engineering module 158. The dialing plan engineering module 158 includes the feature engineering block 164, the signal network engineering block 166 and the dialing plan engineering block 168. The feature engineering block 164 pulls existing features from other databases that contain feature definitions with embedded office dependant information into the new environment modified to the new database. The signal network engineering module 166 transfers data content regarding signaling information. The dialing plan engineering module 168 maps numbers that differentiate the route of the call and defines everything that is not hardware routing, trunking, lines, subscribers, and complete customer calling information.

The third feature of SEES is the network engineering module 170. The network engineering module 170 includes the signaling system 7 (ss7) block 174, the NA7 block 176, the ISDN user part (ISUP) block 178, the TUP block 180 and the British Telecom 7 (BT7) block 182. Other blocks can also be added that focus on the international standard of particular countries or particular telecommunication companies.

The fourth feature of SEES is the operator services feature 172. These services include but are not limited to directory assistance, automatic call distributor/distribution, toll and assistance applications, administrator measurements-operator, automated calling card services, automated operator trainer, automatic call distribution (ACD), busy line verification, and emergency alerts.

The fifth feature of SEES is the private branch exchange module 159. The private branch exchange module 159 is used to configure databases related to private branch exchange networks.

The sixth feature of the computer program is the intelligent network module 173. The intelligent network module 173 includes the dialing plan module 158, the hardware engineering module 156, and the network engineering module 170. These three components should be implemented prior to performing an intelligent network configuration.

The seventh feature of the computer program is the wireless module 171. The wireless module 171 includes the dialing plan module 158, the hardware engineering module 156, and the network engineering module 170. These three components should be implemented prior to performing a wireless configuration.

Figure 5:
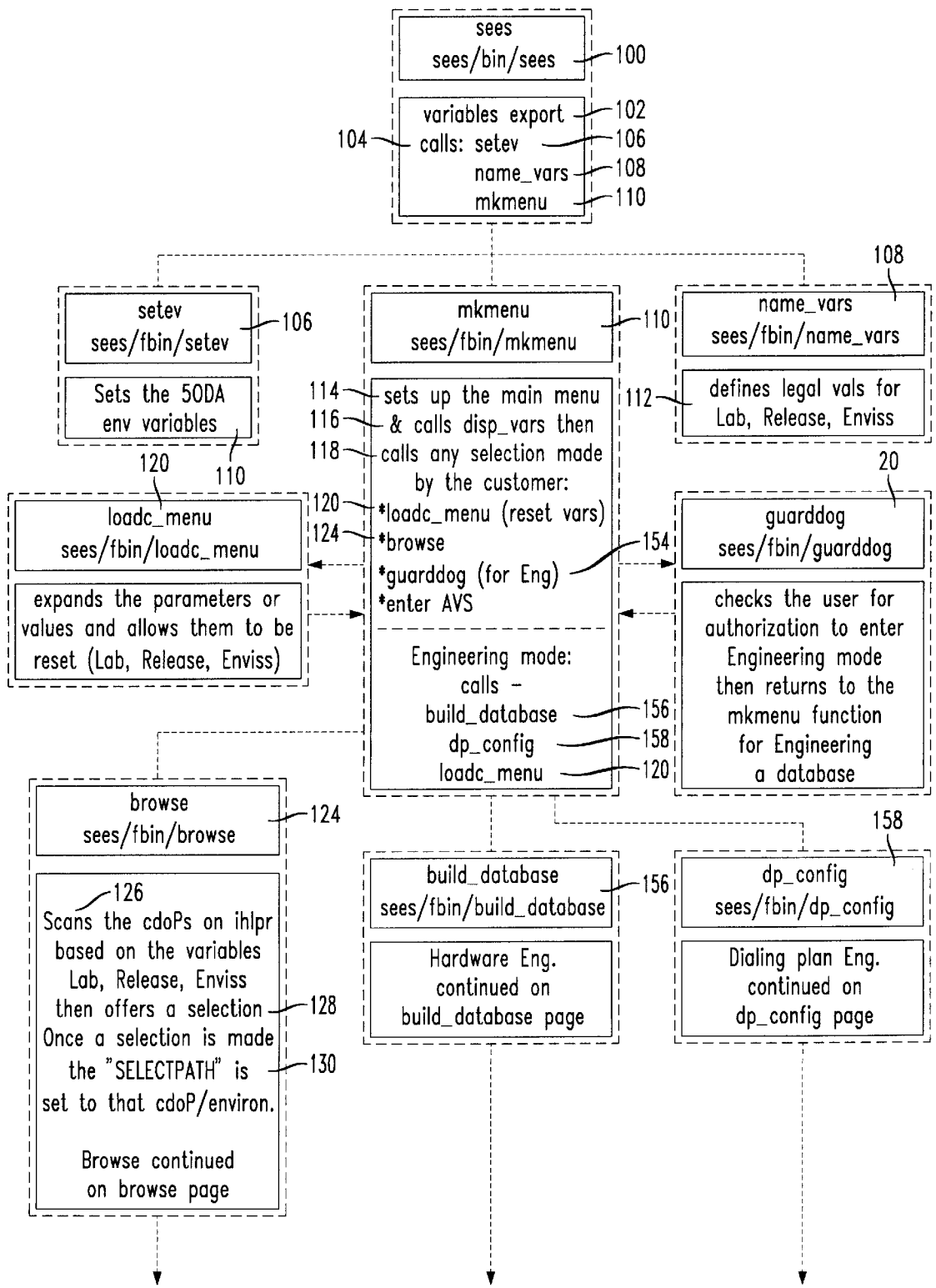
FIG. 5 is a flow chart of the logical operation of the computer program.

FIG. 5 is a flow chart of the logical operation of Simple Environment Engineering System. SEES 100 accesses variables 102 by calling the setev routine 106, the name variable (name_vars) routine 108 and the make menu (mkmenu) routine 110. The setev routine 106 sets the office data administration variables. The setev routine 106 also sets the office data administration environmental variables that provides a description of the functionality that setev routine 106 provides. The name variable (name_vars) routine 108 sets certain variable values. The name variables (name_vars) routine 108 defines legal values 112 for lab, release and enviss. Lab is the total testing environment that simulates the product being sold to the customer. Release is the hardware, software options (SWOPT), equipment configuration database and the office dependant database relating to the telecommunication switch 33 being used by SEES in the creation 153 or modification 155 of a database. The enviss routine is the environment tool version that the office data administration is supporting. The make menu (mkmenu) routine 110 sets up the main menu 114 and calls a display variable (disp_vars) routine 116, then calls any selection made by the user.

From the make menu (mkmenu) routine 110, the user can access the loadc_menu routine 120 that expands the parameters or values and allows them to reset lab, release and enviss. The make menu (mkmenu) routine 110 also allows the user to access browse 124, and the create a new database 153 or build an existing database 155. To access either create a new database or build an existing database, the user must first pass a guard dog 20. The guard dog 20 functions as a screen permitting only authorized users into these sensitive areas of the data build machine 26 to either create 153 or modify 155 databases. The browse feature 124 allows users to view hardware and software configurations on known telecommunication switches 33.

Figure 6:
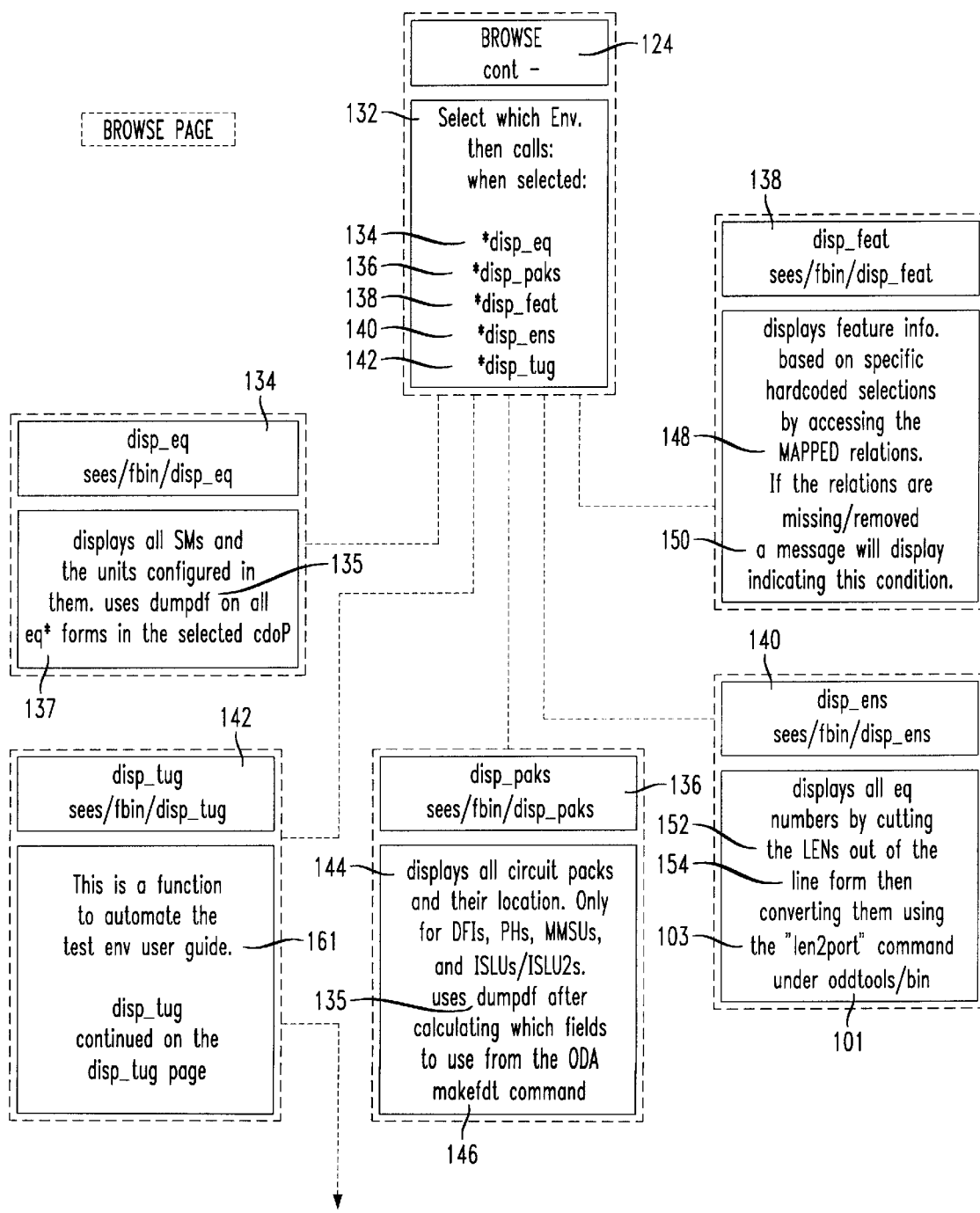
FIG. 6 is a flow chart of the browse feature of the computer program.

FIG. 6 illustrates the browse feature 124. The browse feature 124 allows the user to select the environment 132, then calls the display equipment (dis_eq) routine 134, the display packs (disp_paks) routine 136, the display features (disp_feat) routine 138, the display equipment number (disp_ens) routine 140 and the display the test user guide (disp_tug) routine 142. The display equipment (dis_eq) routine 134 displays all switch module and unit configuration within the switch module. The dumpdf routine 135 is used on all eq* forms (equipment related data) 137 in the selected circuit packs. The display packs (disp_pak) routine 136 displays all circuit packs 144 and their locations. The display packs (disp_paks) routine 136 uses dumpdf 135 after extracting the appropriate data to view from the office data administration makefdt command 146. The display feature (disp_feat) routine 138 displays the feature information based on specific hardcoded selections by accessing the mapped relations 148. If the mapped relations 148 are missing or removed, a message 150 will display indicating this condition. The display equipment number (disp_ens) routine 140 displays all equipment numbers by cutting the line equipment numbers 152 out of the data structures 154 and optionally, converts them using the len2port command 103 under oddtools/bin 101. The display test user guide (disp_tug) routine (optional) 142 automates the test environment user guide 161.

Figure 7:
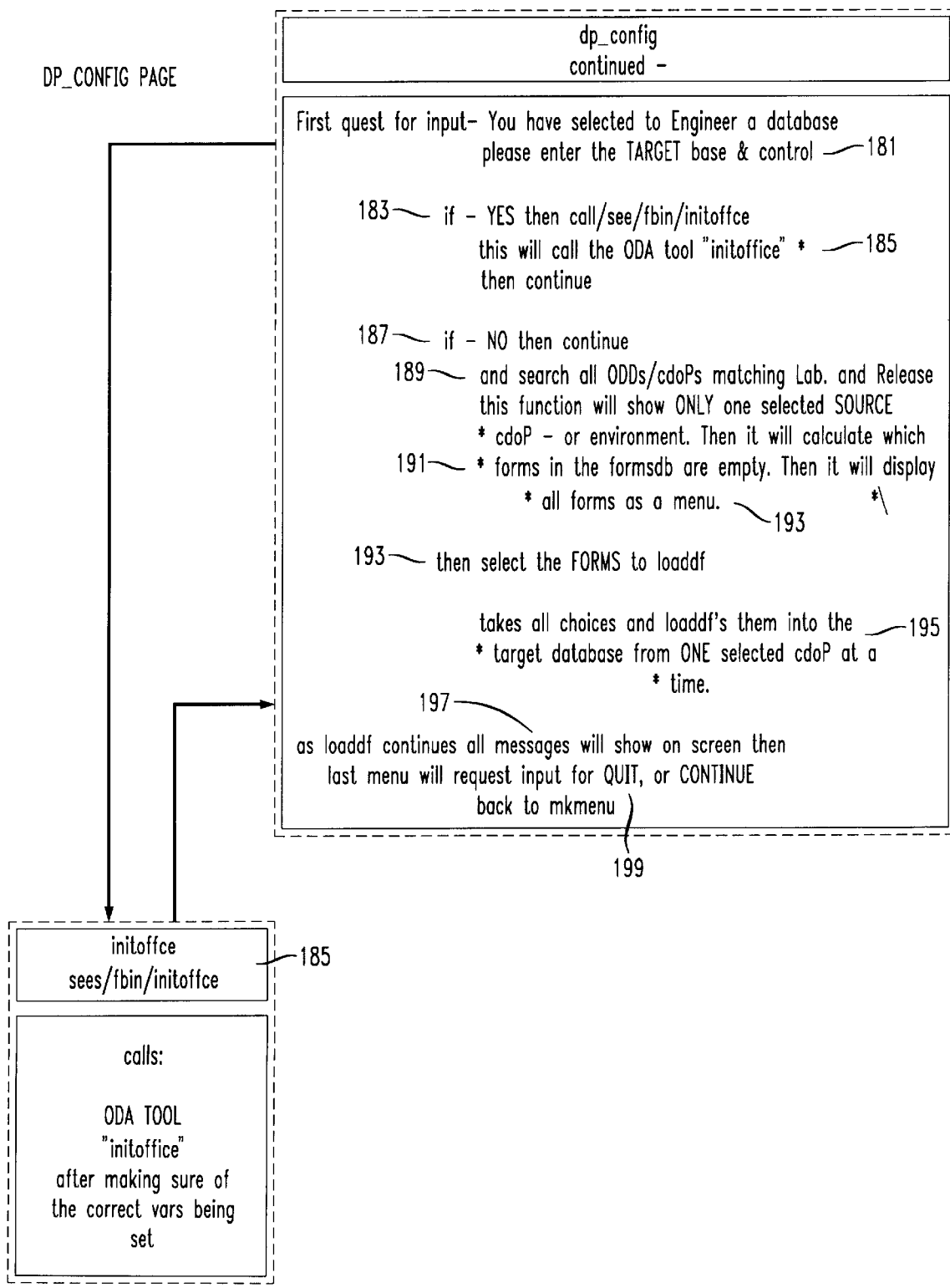
FIG. 7 is a flow chart of the dialing plan feature configuration of the computer program.

FIG. 7 illustrates the dialing plan configuration (dp_config) routine. The user is prompted for the target "base&control" 181. Base&control is the location where the new database is created and manipulated. If the user responds yes 183, then the computer program calls the office data administration tool initoffice 185. Init-office 185 builds a database structure containing no data. Init-office 185 calls an office data administration tool that confirms that the correct version of vars 108 is running. If the user responds no 187, then the computer program searches 189 all of the office dependent databases. This function will show only one selected source environment. Then it will determine those data elements in the data elements database that are empty 191. It will then display all data elements as a menu. The computer program then selects the data elements to load 193 and takes all choices and loads them into the new database structure 195. As the load process continues, all messages 197 will show on the screen then the last menu will request input for ending the dialing plan configuration 199.

Figure 8:
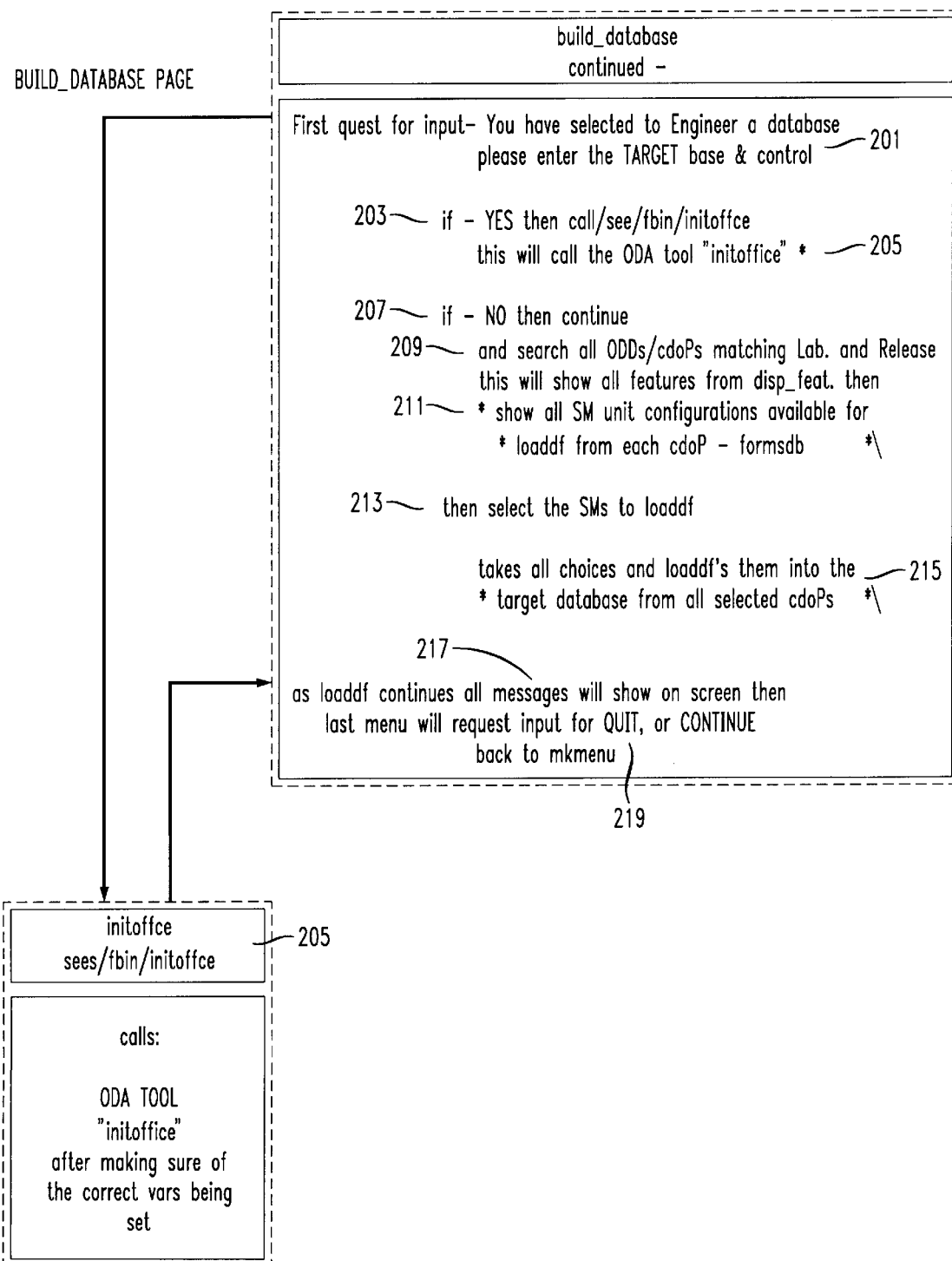
FIG. 8 is a flow chart of the build database feature configuration of the computer program.

FIG. 8 illustrates the build database feature. The user is prompted for the target "base&control" 201. From the response to the new location 203, then the computer program calls the office data administration tool init-office 205. The init-office routine 205 builds a database structure containing no data. The init-office routine calls 205 an office data administration tool that confirms that the correct version of vars is running. If the user responds no 207, then the computer program searches 209 all of the office dependent databases. This function will show all features and display all switching module configurations available to load into the data elements 211. The program will then allow the user to select those switching modules to load in the new data structure 213. The program takes all the user selected choices and loads them into the new database structure 215. As the load process continues, all messages 217 will show on the screen then the last menu will request input for ending the dialing plan configuration 219.

Figure 9:
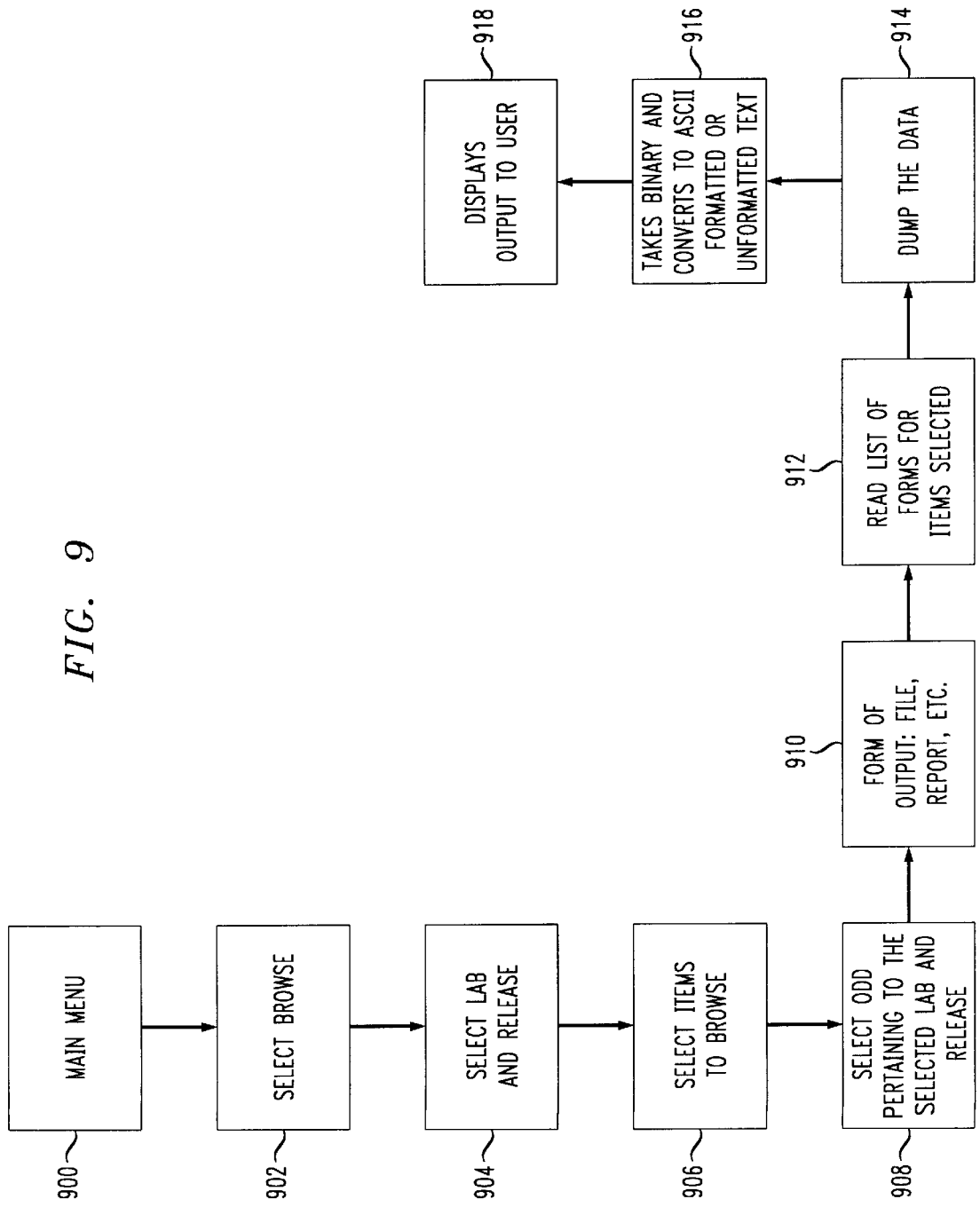
FIG. 9 illustrates the browse feature of the database configuration program.

FIG. 9 illustrates the browse feature of the database configuration program. From the main menu 900, a user can select the browse feature 902 that allows the user to search for various source databases containing the desired data elements for configuring into a new database. The user selects the lab and release 904 of the new database so that the source databases correspond to the desired new database. The user also selects the items the computer program will browse 906. These items can include hardware by unit, configuration by pack and unit, lines, trunks, multiline hunt groups, peripheral interface data bus/peripheral interface control bus (PIDB/PICB), customized reports, or trunks and lines containing digit analysis and trunk forms.

The computer program allows the user to select the office dependent database (ODD) pertaining to the lab and release 908. Block 910 allows the user to specify the desired form of the output (e.g., file, report, etc.). The program reads a list of forms 912 for the items selected in block 906 and the program dumps the data 914. The binary data is converted to ASCII formatted or unformatted text 916. The program then displays the output 918 to the user in the form selected in block 910.

Figure 10:
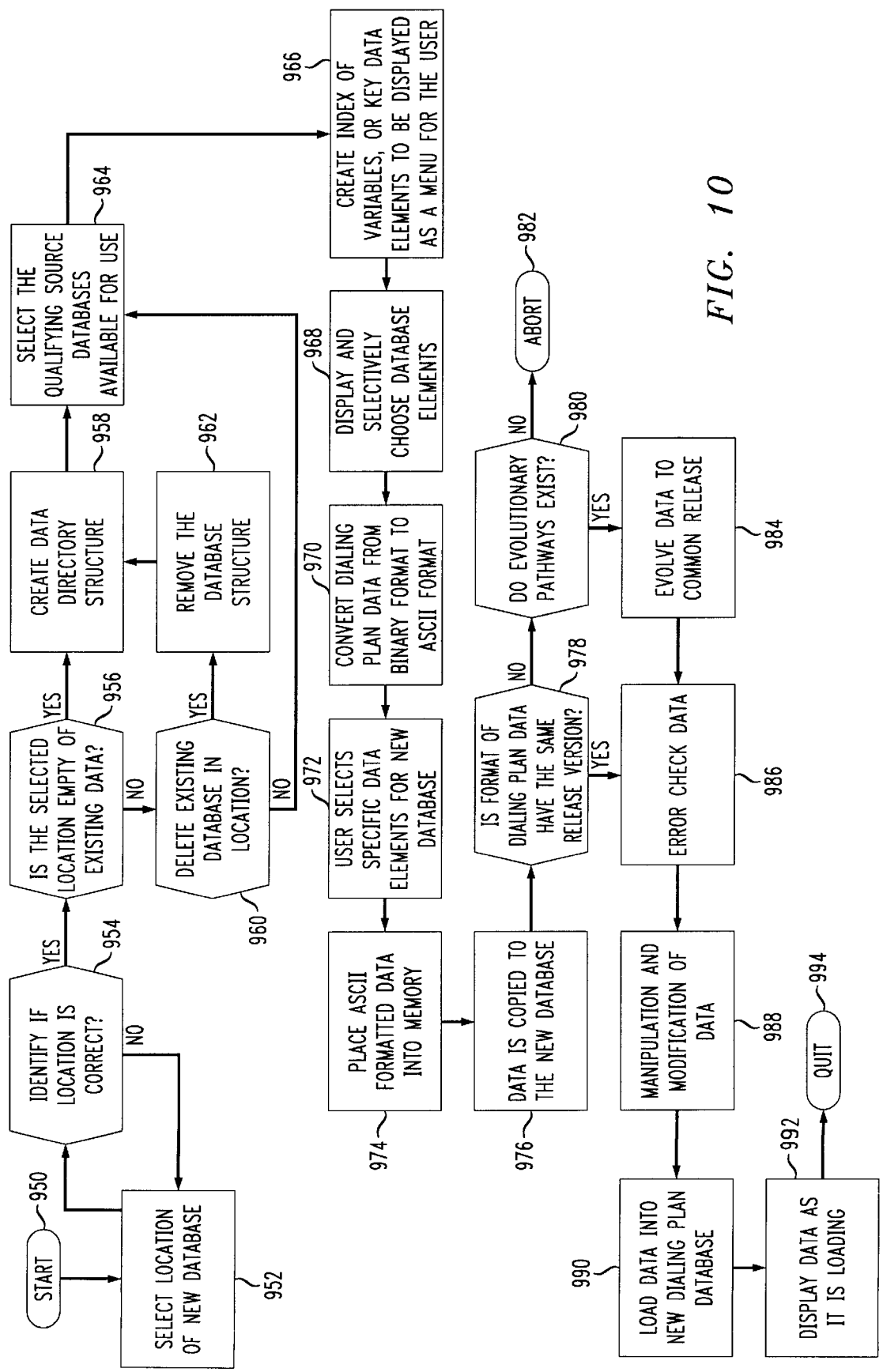
FIG. 10 illustrates the configuration of a database from at least one source database.

FIG. 10 illustrates the configuration of a database from at least one source database. The browse feature allows users to view data despite its name classification across software releases. This is accomplished by the computer program applying those field names applicable to the desired database. The script maintains a list of all the valid attribute names. If the attribute name changes, the script is updated and the name change is accomplished dynamically. The user calls and starts 950 the computer program. The computer program can be located on one machine (a computer device) or multiple machines virtually connected via a network file share capability allowing all the virtual machines to appear as one machine and containing all existing source databases or source data resources. In the main menu of the computer program, a text or graphical user interface presents the main menu to the user allowing the user to select whether to browse existing source databases and source data resources or whether the user desires to create a new source database or engineer (modify) an existing source database from all or parts of other existing source databases or source data resources.

When the user selects the engineering feature, the user is required to select the location of the new database 952. Selecting means selecting an item from a menu or inputting information such that the computer can react to the instruction. In addition, the user must select whether the new or modified database should be located on the same machine (computer) or a virtual machine (computer), should the database be created or modified, and whether the database should be inclusively updated. The location of the new database 952 is confirmed 954 with the user and if the confirmation is not correct, the computer program allows the user to reselect a different location 952.

The computer program searches or checks the node or location where the user intends for the new or modified database to be located. This node check will confirm the actual location of the database, and whether the node is free 956 on the desired machine (computer). The computer program confirms whether the selected location of the new database is empty of existing data 956. If the response from the user is yes, the computer program creates a new directory structure 958. If the response is no, the program allows the user to delete the existing database 960. If the database is deleted, the program removes the database structure 962 and creates a new directory structure 958. The directory structure can be created to hold similar and dissimilar size data as compared to the source databases.

If the existing database structure is not deleted, or the program created a new directory structure, the computer program then allows the user to select the qualifying source databases available for use 964. The source databases might have access utilities to assist the in the configuration of a new database. The computer program then selects qualifying existing source data resources using the user set criteria in input when the user was prompted to select the lab, machine (computer), site, customer name, and software release. The computer program requires the user to select and input certain elements regarding the characteristics desired in the new database to be created in order to search existing source databases and source data resources for existing data. For example, the user will be prompted to select the lab, the computer or machine, the site location of the new or modified database, the customer name, the software release, and the version of the source database or source data resource.

Next, the computer program synchronizes the source database access utilities with the same versions that correspond to the existing source database or data source resource versions. This allows the source database access utilities to properly interface with the various existing source database or source data resource versions. The data selected from the existing databases or data resources to be copied into the new, empty data directory structure can be selected from related or unrelated data resource types.

An index 966 is created of variables or key data elements and are displayed in a menu for the user. The computer program generates path locations (file pointers) to the location of each data resource on the same or virtual machine (computer). All existing resources are then displayed 968 to the user in a modified subset, easy to read type format, that satisfy the criteria selected by the user when the user was prompted to select the lab, machine (computer), site, customer name, and software release in creating the new data resource, or merging with an existing data resource when the user selected the desired hardware engineering feature.

The user selectively chooses database elements and the program converts data from binary format to ASCII formatted or unformatted text 970. The resources queried in the computer program comprise key data elements extracted from each resource being queried by using a utility for converting the data in a binary format to an ASCII format and the ASCII formatted data is placed into a file for future use.

The computer program allows the user to select the specific data element for the new database 972 and the ASCII formatted data is placed into the memory structure 974. The data is extracted 976 and is automatically copied into the new configuration database 976.

The computer program determines if this format is the same version or release as the new database structure 978. This is accomplished by matching the selected criteria in the software release with the new or existing software release of the directory structure and name. If the format is not the same, the computer program determines if evolutionary pathways exist 980. Evolutionary pathways are well known in the art. If the evolutionary pathways do not exist, the computer program aborts 982. If the evolutionary pathways exist 980, the program calls an evolution tool 984, to modify the saved data so that consistency with the new location is maintained.

If the format is the same version or release as the new database structure 978, or after the evolution of data has occurred 984, the data is error checked 986. The program dynamically manipulates and modifies the data 988 for the new database. Then the data is loaded 990 or merged into a new or existing data resource using a platform utility that converts the data from an ASCII format to a binary format and loads the data into the database. The computer program displays 992 all the statistics on the data elements as they are being loaded into the selected location. In addition, the computer program displays errors, updates, and non-updates to the selected location data resource. The computer program then allows the user to return to the main menu or quit, (exit the program) 994. The browse feature takes multiple data structures and merges selected attributes in at least one of the data structures to create a report (e.g., the browse feature is capable of progressively building a final report).

Please note that while the specification in this invention has been described in relation to certain preferred embodiments, it will be apparent to those skilled in the art that the invention is capable of alternative embodiments and that certain embodiments described in this invention can be varied considerably without departing from the basic scope and principles of the invention.

What is claimed is:

1. A process for configuring a database for a telecommunication device comprising the steps of:
   selecting a new database structure having a version attribute;
   searching at least one source database for desired data fields from a data warehouse having a plurality of source databases;
   selecting desired data from the desired data fields;
   copying the desired data from the desired data fields into a memory area;
   manipulating and modifying the desired data;
   evolving the desired data in response to the version attribute of the new database structure; and
   loading the desired data from the memory area into the new database structure.

2. The process for configuring the new database described in claim 1, where the desired data from the at least one source database is copied to a similar sized data structure in the new database structure.

3. The process for configuring the new database described in claim 1, where the desired data from the at least one source database is copied to a dissimilar sized data structure in the new database structure.

4. The process for configuring the new database described in claim 1, where the desired data comprises dialing plan data.

5. The process for configuring the new database described in claim 1, where the desired data comprises hardware equipment data.

6. The process for configuring the new database described in claim 1, where the desired data comprises network configuration data.

7. The process for configuring the new database described in claim 1, where the desired data comprises operator services data.

8. The process for configuring the new database described in claim 1, where the desired data comprises private branch exchange data.

9. The process for configuring the new database described in claim 1, where the desired data comprises intelligent network data.

10. The process for configuring the new database described in claim 1, where the desired data comprises wireless data.

11. A telecommunication device database configuration computer system, comprising:

a memory capable of storing a data structure having a version attribute, means for selecting the database structure, a means for searching at least one source database from a data warehouse having a plurality of source databases, a means for manipulating data from the at least one source database and a means for copying the data from the at least one source database;

a processor in the computer system for executing searching instructions from a user input means so that the means for searching searches the at least one source database for the data;

the processor in the computer system capable of executing manipulation instructions from the user input means so that the means for manipulating the data from the at least one source database modifies the data, if needed;

the processor in the computer system capable of executing evolution instructions in response to the version attribute so the data from the at least one source database is formatted for the data structure; and the processor in the computer system capable of executing copying instructions from the user input means so that the means for copying the data from the at least one source database, copies the data to the data structure.

12. The database configuration computer of claim 11, where the means for searching seeks dialing plan data from the at least one source database.

13. The database configuration computer of claim 12, where the means for manipulating the data modifies the dialing plan data from the at least one source database.

14. The database configuration computer of claim 12, where the means for copying, copies the dialing plan data from the at least one source database to the data structure.

15. The database configuration computer of claim 11, where the means for searching seeks hardware equipment data from the at least one source database.

16. The database configuration computer of claim 11, where the means for searching seeks network configuration data from the at least one source database.

17. The database configuration computer of claim 16, where the means for manipulating the data modifies the network configuration data from the at least one source database.

18. The database configuration computer of claim 16, where the means for copying, copies the network configuration data from the at least one source database to the data structure.

19. The database configuration computer of claim 11, where the means for searching seeks operator services data from the at least one source database.

20. The database configuration computer of claim 19, where the means for manipulating the data modifies the operator services data from the at least one source database.

21. The database configuration computer of claim 19, where the means for copying, copies the operator services data from the at least one source database to the data structure.

22. The database configuration computer of claim 11, where the means for searching seeks private branch exchange data from the at least one source database.

23. The database configuration computer of claim 22, where the means for manipulating the data modifies the private branch exchange data from the at least one source database.

24. The database configuration computer of claim 22, where the means for copying, copies the private branch exchange data from the at least one source database to the data structure.

25. The database configuration computer of claim 11, where the means for searching seeks intelligent network data from the at least one source database.

26. The database configuration computer of claim 25, where the means for manipulating the data modifies the intelligent network data from the at least one source database.

27. The database configuration computer of claim 25, where the means for copying, copies the intelligent network data from the at least one source database to the data structure.

28. The database configuration computer of claim 11, where the means for searching seeks wireless data from the at least one source database.

29. The database configuration computer of claim 28, where the means for means for manipulating the wireless data modifies the wireless data from the at least one source database.

30. The database configuration computer of claim 11, where the means for copying, copies the wireless data from the at least one source database to the data structure.

\* \* \* \* \*